United States Patent Office 2,962,497
Patented Nov. 29, 1960

2,962,497

DYESTUFFS OF THE ANTHRAPYRIDONE AND ANTHRAPYRIDINE SERIES COMPRISING A HALOGENATED TRIAZINYL GROUP

Jacques Guenthard, Basel, Switzerland, assignor to Sandoz Ltd., Basel, Switzerland No Drawing. Filed Jan. 29, 1959, Ser. No. 790,318

Claims priority, application Switzerland Jan. 31, 1958

5 Claims. (Cl. 260—249)

The present invention relates to dyestuffs of the anthraquinone series which contain reactive groups and correspond to the formula

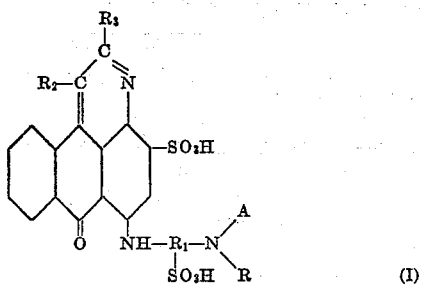

(I)

wherein

R stands for a halogeno acetyl radical, a halogenopropionyl radical or the radical of a cyclic, six-membered triazine compound containing two halogen atoms attached to carbon atoms,
A for hydrogen or a low molecular alkyl radical,
R₁ for a phenylene or diphenylene radical which contains the

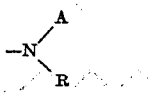

group in para-position to the —NH group,
R₂ for a low molecular carbalkoxy radical, a low molecular alkylcarbonyl radical, or a phenylcarbonyl radical which may be substituted,
and
R₃ for the hydroxy group, a low molecular alkyl radical or a phenyl radical which may be substituted, when R₂ stands for a low molecular carbalkoxy radical, but only for the hydroxy group when R₂ stands for a low molecular alkylcarbonyl radical or a phenylcarbonyl radical which may be substituted.

The process for their production consists in reacting 1 mole of a dyestuff of the formula

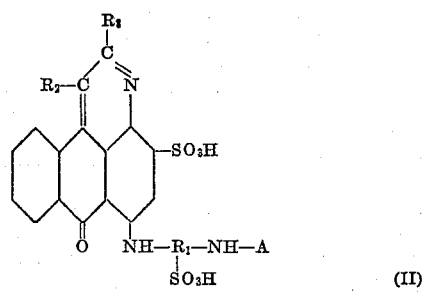

(II)

wherein

A, R₂ and R₃ possess the aforecited meanings and

R₁ stands for a phenylene or diphenylene radical which contains the —NH—A group in para-position to the —NH group, with 1 mole of a functional derivative of a halogeno acetic or a halogenopropionic acid or with 1 mole of a cyclic, six-membered triazine compound containing three halogen atoms attached to carbon atoms.

The dystuffs of Formula II which are used as starting substances are 3-azabenzanthrone derivatives and are produced by the known methods. R₂ denotes preferably a carbomethoxy, carbethoxy, acetyl or benzoyl group, when R₃ is a hydroxy group, but its meaning is restricted to a carbomethoxy or carbethoxy group when R₃ is a methyl or phenyl group. Especially interesting representatives are, e.g., 1-acetyl- or 1-benzoyl- or 1-carbethoxy-2-hydroxy-6-(4'-amino)-phenylamino-3-azabenzanthrone-4.2'-disulfonic acid,
1-acetyl- or 1-benzoyl- or 1-carbethoxy-2-hydroxy-6-(4'-methylamino) - phenylamino - 3 - azabenzanthrone-4.2'-disulfonic acid,
1-acetyl- or 1-benzoyl- or 1-carbethoxy-2-hydroxy-6-[4'-(4'' - amino)-phenyl]-phenylamino-3-azabenzanthrone-4.2'- or 4.2''-disulfonic acid,
1-carbethoxy-2-methyl- or -2-penyl-6-(4'-amino)-phenyl-amino-3-azabenzanthrone-4.2'-disulfonic acid, and
1-carbethoxy-2-methyl- or -2-phenyl-6-[4'-(4''-amino)-phenyl]-phenylamino-3-azabenzanthrone-4.2'- or -4.2''-disulfonic acid.

Of the functional derivatives of a halogeno acetic or halogenopropionic acid preference is given to the anhydride and the chloride of chloroacetic and β-chloropropionic acid, while cyanuric chloride can be taken as an example of the triazine compounds coming within the scope of the process.

The reaction of the dyestuffs of Formula II used as starting substances with a functional derivative of a halogeno acetic or halogenopropionic acid or a cyclic, six-membered triazine compound containing three halogen atoms attached to carbon atoms is conducted preferably in aqueous medium. The functional halogeno acetic or halogenopropionic acid derivative or the trihalogenotriazine compound can be employed as such in concentrated form or, if desired, in solution in an organic solvent. Acetone is a specially suitable solvent for this purpose.

The reaction temperature is adjusted to the reactivity of the individual starting substances and varies between 0° and 100° C. If it is desirable to effect the reaction at temperatures higher than 50–60° C., e.g. with a halogeno acetic anhydride, it is advisable to work in closed vessels equipped with reflux condensers.

The reaction is carried out in a weakly alkaline, neutral to weakly acid medium, but preferably within the pH region of 10.0 to 3.0. To neutralise the hydrogen halide which may be formed, an acid-binding agent such as sodium acetate or ammonium acetate can be added to the reaction solution at the start of the operation, or during the reaction small portions of sodium or potassium carbonate or bicarbonate in solid, powdered form as a concentrated aqueous solution can be added. Other suitable neutralizing agents are aqueous solutions of sodium or potassium hydroxide. The addition of small amounts of a wetting or emulsifying agent to the reaction mixture can accelerate the rate of reaction.

In the reaction of functional derivatives of a halogeno acetic or halogenopropionic acid with the free amino group a halogeno acetylamino or halogenopropionyl-amino group is formed. In the reaction of a trihalogenotriazine compound with the free amino group only one halogen atom reacts with an exchangeable hydrogen atom.

On completion of condensation the dyestuff is salted out of the solution or suspension, which may be previously neutralized if desired, with sodium or potassium chloride or precipitated with acid. The precipitate is filtered with suction, washed until a neutral reaction is obtained, and finally dried.

The dyestuffs obtained in accordance with the invention are suitable for dyeing, padding and printing fibers of animal and vegetable origin, fibers of regenerated cellulose, casein fibers, animalized cellulose fibers, polyamide fibers, mixtures of the preceding fibers, and leather. The material is treated during or after dyeing with agents of alkaline reaction in a warm liquid or gaseous medium. The dyeings thus produced possess good fastness to light, washing, milling, and perspiration.

In the following examples the parts and percentages are by weight and the temperatures are in degrees centigrade.

EXAMPLE 1

27.75 parts of the dyestuff 1-acetyl-2-hydroxy-6-(4'-amino) - phenylamino - 3 - azabenzanthrone - 4.2 - disulfonic acid are dissolved in 1000 parts of water and about 15 parts of a 30% sodium hydroxide solution. After the addition of 9.3 parts of cyanuric chloride and 10 drops of a commercial sulfonated fatty acid ester, the emulsion is vigorously stirred at 0–5°. Small portions of potassium carbonate are added to maintain the pH value between 6.0 and 8.0. When the condensation reaction has run its course 50 parts of potassium chloride are strewn in, causing the new dyestuff to be precipitated from the solution. It is filtered off, washed with a dilute aqueous solution of potassium chloride, and dried in vacuo at 50–60°. The dark powder obtained dissolves in water to give violet-red solutions. When it is padded on cellulosic fiber fabrics from aqueous solution and subsequently heat-treated in the presence of an agent of alkaline reaction, violet-red dyeings are obtained which are fast to light and wet agencies.

EXAMPLE 2

35.25 parts of the dyestuff sodium 1-carbethoxy-2-hydroxy - 6 - [4' - (4" - amino) - phenyl] - phenylamino-3-azabenzanthrone-4.2'-disulfonate are dissolved in 1000 parts of water at 50°.

The solution is cooled to 20° with simultaneous dropwise addition of 14 parts of chloroacetyl chloride and, in the course of 30 minutes, the amount of 30% sodium hydroxide solution required to maintain a pH value of 8.0 to 9.0. The mass is stirred for some time longer until the starting substance is no longer indicated by chromatography of a sample on a talc column.

The dyestuff is precipitated by means of 60 parts of common salt, filtered off and dried. On grinding it is obtained as a powder which is soluble in water, giving violet-red solutions. Padded from aqueous solution on cellulosic fibers and subjected to an alkaline heat-treatment, the dyestuff yields violet shades which are fast to light and wet treatments.

100 parts of cotton sateen are padded at room temperature with a 2% neutral aqueous solution of the above dyestuff in presence of 1 gram per liter of turkey red oil. The padded fabric is squeezed to give an increase of 60% to 120% over the dry weight. While still moist it is entered in a developing bath (liquor to goods ratio 50:1) which contains 300 grams per liter of common salt and 5 ml. per liter of sodium hydroxide solution of 66° Tw. It is treated in this bath for 20–30 minutes at 90–95°, then thoroughly rinsed in cold water, and soaped at the boil for 20 minutes with additions of 5 grams per liter of soap and 2 grams per liter of sodium bicarbonate (liquor ratio 20:1). After a further thorough rinse the dyed fabric is dried.

EXAMPLE 3

29.15 parts of 1-carbethoxy-2-methyl-6-(4'-methylamino)-phenylamino-3-azabenzanthrone-4.2'-disulfonic acid are dissolved in 600 parts of water and 14 parts of 30% sodium hydroxide solution at 50°. At this temperature small portions of melted chloroacetic anhydride are dropped in, together with sufficient sodium bicarbonate to give a constant pH of 6.0–7.0. The reaction is completed when the starting substance is no longer indicated in a sample. The dyestuff is precipitated with 60 parts of sodium chloride and filtered off; the filter cake is washed with brine until of neutral reaction and then dried and ground. The powder obtained dissolves in water with an orange-red coloration; applied from weakly alkaline dyebaths, it dyes fibers of natural or regenerated cellulose in orange-red shades which are fast to light and wet agencies.

In the following table are listed further dyestuffs containing reactive groups which are obtainable according to the process described in Examples 1 to 3. They have the formula

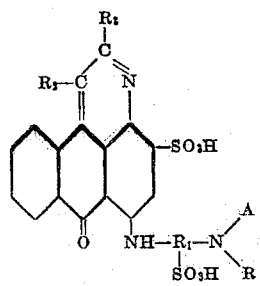

and are characterized by the symbols A, R, $R_1$, $R_2$ and $R_3$, the positions of the

and —$SO_3H$ groups in the radical $R_1$, and the shade of their dyeings on cotton.

Table

| Example No | (I) A | (II) R | (III) R₁ | (IV) Positions of | | (V) R₂ | (VI) R₃ | (VII) Shade of Dyeing on Cotton |
|---|---|---|---|---|---|---|---|---|
| | | | | $-N\genfrac{}{}{0pt}{}{A}{R}$ | $-SO_3H$ | | | |
| 4 | hydrogen | 4.6-dichloro-1.3.5-tri-azinyl | phenylene | 4' | 2' | benzoyl | hydroxy | violet-red. |
| 5 | do | do | do | 4' | 2' | carbethoxy | phenyl | orange-red. |
| 6 | methyl | do | do | 4' | 2' | do | do | Do. |
| 7 | hydrogen | do | diphenylene | 4' | 2' | carbomethoxy | methyl | red. |
| 8 | methyl | chloroacetyl | phenylene | 4' | 2' | acetyl | hydroxy | violet-red. |
| 9 | hydrogen | do | do | 4' | 2' | do | do | Do. |
| 10 | methyl | do | do | 4' | 2' | carbethoxy | do | Do. |
| 11 | do | do | do | 4' | 2' | carbomethoxy | do | Do. |
| 12 | do | do | do | 4' | 2' | do | methyl | orange-red. |
| 13 | hydrogen | do | do | 4' | 2' | carbethoxy | do | Do. |
| 14 | do | do | do | 4' | 2' | do | phenyl | Do. |
| 15 | methyl | do | do | 4' | 2' | do | do | Do. |
| 16 | hydrogen | do | diphenylene | 4'' | 2' | do | methyl | Red. |
| 17 | do | do | do | 4'' | 2' | do | phenyl | Do. |
| 18 | do | do | do | 4'' | 2' | benzoyl | hydroxy | violet. |
| 19 | do | do | do | 4'' | 2' | acetyl | do | Do. |
| 20 | do | 4.6-dichloro-1.3.5-tri-azinyl | do | 4'' | 2' | do | do | Do. |
| 21 | do | do | do | 4'' | 2' | benzoyl | do | Do. |
| 22 | methyl | do | phenylene | 4' | 2' | do | do | violet-red |
| 23 | do | do | do | 4' | 2' | acetyl | do | Do. |
| 24 | do | do | do | 4' | 2' | carbethoxy | do | Do. |
| 25 | hydrogen | do | do | 4' | 2' | do | do | Do. |
| 26 | do | do | do | 4' | 2' | do | methyl | orange-red |
| 27 | methyl | do | do | 4' | 2' | do | do | Do. |
| 28 | hydrogen | do | diphenylene | 4'' | 2' | do | hydroxy | violet |
| 29 | do | β-chloropropionyl | phenylene | 4' | 2' | benzoyl | do | violet-red |
| 30 | methyl | do | do | 4' | 2' | acetyl | do | violet. |
| 31 | hydrogen | do | do | 4' | 2' | carbethoxy | phenyl | orange-red. |

Formulae of representative dyestuffs of the foregoing examples are as follows:

*Example 1*

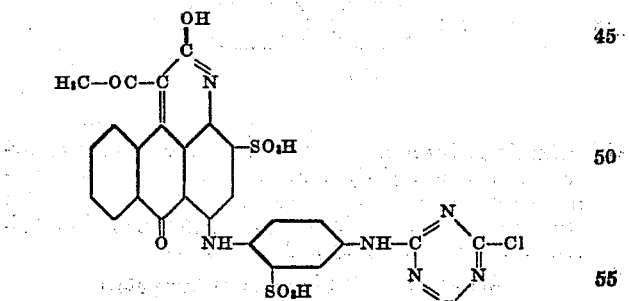

*Example 4*

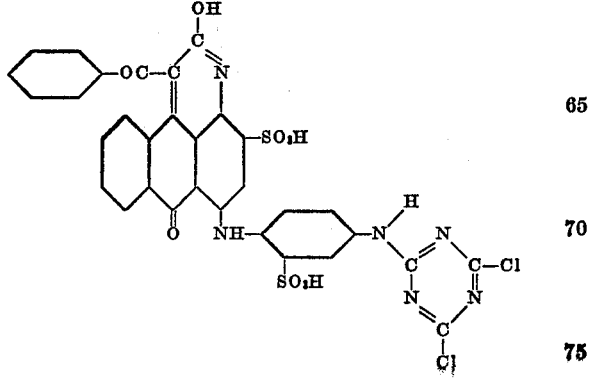

*Example 10*

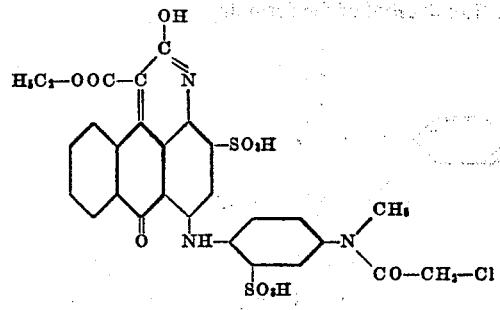

*Example 22*

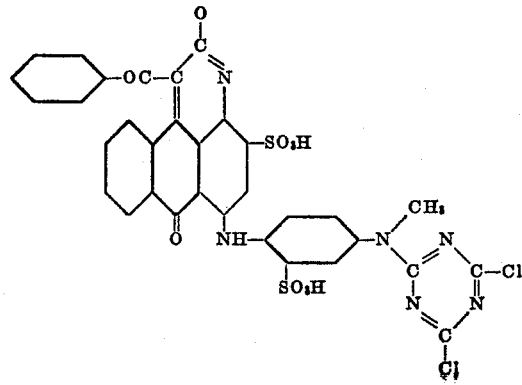

Example 26

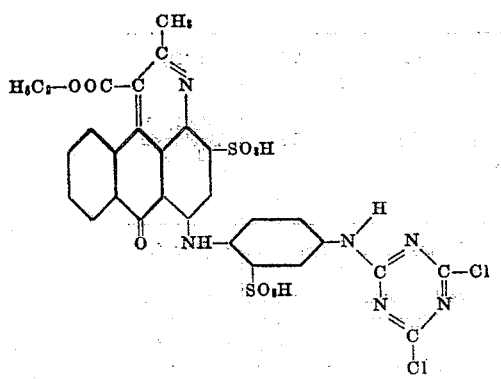

Having thus disclosed the invention what I claim is:
1. The dyestuff of the formula

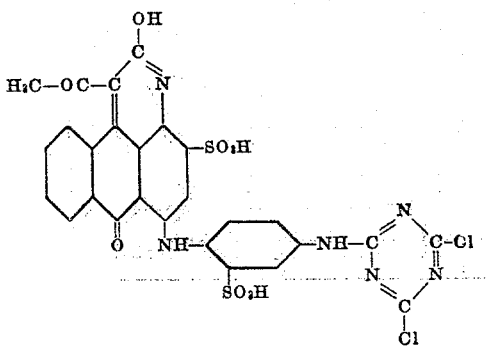

2. The dyestuff of the formula

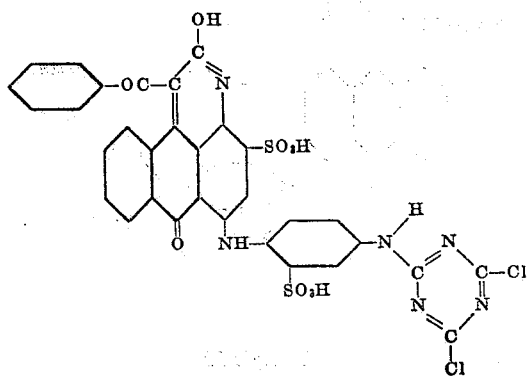

3. The dyestuff of the formula

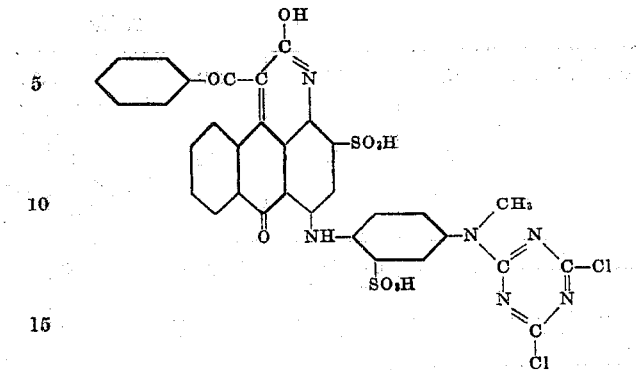

4. The dyestuff of the formula

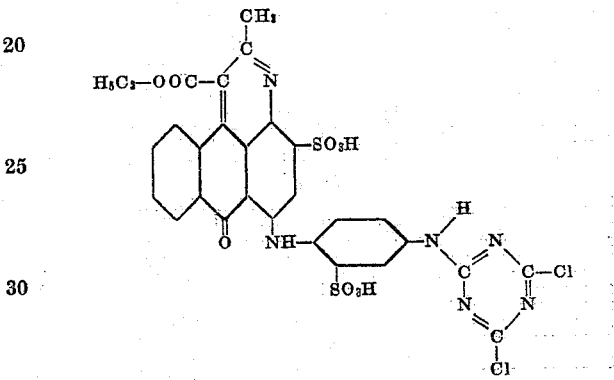

5. A dyestuff of the formula:

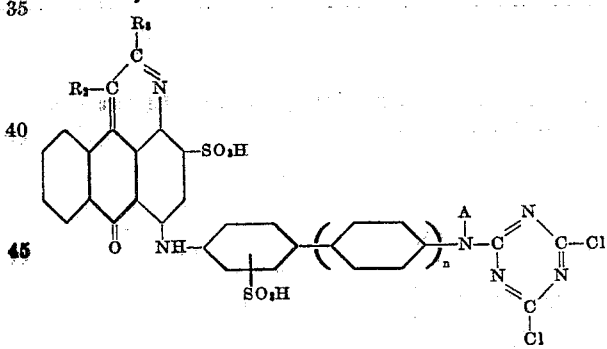

wherein A is selected from the group consisting of hydrogen and methyl, $R_2$ is selected from the group consisting of lower carbalkoxy and benzoyl, $R_3$ is selected from the group consisting of hydroxy, methyl and phenyl, and $n$ is a numeral ranging from 0 to 1.

References Cited in the file of this patent
UNITED STATES PATENTS
2,759,939    Bucheler et al. _____ Aug. 21, 1956

UNITED STATES PATENT OFFICE
CERTIFICATION OF CORRECTION

Patent No. 2,962,497                November 29, 1960

Jacques Guenthard

It is hereby certified that error appears in the above numbered patent requiring correction and that the said Letters Patent should read as corrected below.

Column 2, line 32, for "dystuffs" read -- dyestuffs --; line 51, for "penyl" read -- phenyl --; column 6, lines 60 to 62, for the upper portion of the formula reading

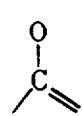 read 

Signed and sealed this 25th day of July 1961.

(SEAL)
Attest:

ERNEST W. SWIDER
Attesting Officer

DAVID L. LADD
Commissioner of Patents